US011951743B2

(12) United States Patent
Terasaki

(10) Patent No.: US 11,951,743 B2
(45) Date of Patent: Apr. 9, 2024

(54) METHOD FOR PRODUCING A SILICON SUBSTRATE AND METHOD FOR PRODUCING A LIQUID EJECTION HEAD

(71) Applicant: CANON KABUSHIKI KAISHA, Tokyo (JP)

(72) Inventor: Atsunori Terasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/868,179

(22) Filed: Jul. 19, 2022

(65) Prior Publication Data

US 2023/0065484 A1 Mar. 2, 2023

(30) Foreign Application Priority Data

Jul. 26, 2021 (JP) ................................ 2021-121566

(51) Int. Cl.
*B41J 2/16* (2006.01)

(52) U.S. Cl.
CPC ............ *B41J 2/164* (2013.01); *B41J 2/1601* (2013.01); *B41J 2/1628* (2013.01); *B41J 2202/22* (2013.01)

(58) Field of Classification Search
None
See application file for complete search history.

(56) References Cited

U.S. PATENT DOCUMENTS

| | | | | |
|---|---|---|---|---|
| 2004/0220066 A1* | 11/2004 | Rutter, Jr. | C11D 7/3209 510/175 |
| 2010/0079548 A1* | 4/2010 | Park | B41J 2/1632 430/320 |
| 2016/0023462 A1* | 1/2016 | Chen | B41J 2/14016 29/890.1 |
| 2017/0037344 A1* | 2/2017 | Chang | C11D 7/34 |
| 2017/0103920 A1* | 4/2017 | Sekiya | H01L 21/78 |
| 2019/0122894 A1* | 4/2019 | Yamaguchi | C23C 16/481 |
| 2020/0157422 A1* | 5/2020 | Liu | H01L 21/32134 |

FOREIGN PATENT DOCUMENTS

JP 2000-056480 A 2/2000

* cited by examiner

*Primary Examiner* — Shamim Ahmed
(74) *Attorney, Agent, or Firm* — Venable LLP

(57) ABSTRACT

A method for producing a silicon substrate comprising a silicon base material; and a wiring formation layer laminated on a base material surface of the silicon base material, and being provided with a wiring member, an electrode member comprising a noble metal, and a close contact member comprising a base metal between the wiring member and the electrode member, wherein the method comprises a step of forming a deposition film by a fluorocarbon gas, in etching of the silicon substrate; and a removal step of removing, by a removal solution, the deposition film formed by the fluorocarbon gas; the removal solution comprises a primary amine and an organic polar solvent; a content of water in the removal solution is 10 mass % or lower; and a content of tetramethylammonium hydroxide in the removal solution is 1 mass % or lower.

20 Claims, 2 Drawing Sheets

METHOD FOR PRODUCING A SILICON SUBSTRATE AND METHOD FOR PRODUCING A LIQUID EJECTION HEAD

BACKGROUND OF THE INVENTION

Field of the Invention

The present disclosure relates to a method for producing a silicon substrate, mainly to a method for producing a silicon substrate used in a liquid ejection head.

Description of the Related Art

There are numerous examples of boring through a silicon substrate, or of processing of a structure along the depth of a silicon substrate, in general MEMS (Micro Electro Mechanical Systems) processing and in some instances of semiconductor device processing. At present, silicon substrates used for liquid ejection heads are processed by relying on semiconductor device microfabrication techniques. In general liquid ejection heads that are used in liquid ejection printing methods, a flow channel member is formed on the silicon substrate.

The flow channel member makes up an ejection port for ejecting droplets and a liquid flow channel connected to the ejection port. Generally, multiple liquid flow channels are disposed in a row. Further, an ejection energy generating element is provided on the silicon substrate, in part of the liquid flow channel, such that droplets are ejected, from an ejection port, by virtue of the energy generated by the ejection energy generating element. Further, the silicon substrate is formed therein with a plurality of liquid feeding ports connected to respective liquid flow channels, and a common liquid chamber communicating with the liquid feeding ports.

In a liquid ejection head having such a configuration, for instance the liquid is heated by utilizing thermal energy from the ejection energy generating element such as an ejection heater, to cause the liquid to foam up, as a result of which droplets are ejected from the ejection port. Liquid is then supplied from the feeding port to the liquid flow channels, and from the common liquid chamber liquid to the feeding port.

To form such a feeding port, it is necessary to form an opening in a silicon substrate and form an opening in a silicon-based insulating film laid up on the ejection energy generating element side; vertical processing by dry etching may be resorted to herein for instance from the viewpoint of increasing density. Silicon-based insulating films are ordinarily etched using a gas that is mainly made up of fluorocarbon. A high-speed process referred to as the Bosch process is preferably used in silicon substrate etching. Dry etching relying on the Bosch process is a technique including cycles in each of which the following three steps are repeated sequentially and continuously.

(1) Etching of silicon with fluorine-based radicals (2) Formation of a fluorocarbon-based passivation layer (3) Removal of the passivation layer at the bottom of a pattern, by ions A vertically etched shape can be achieved by continually protecting the side wall of an etched pattern formed in step (1) using the passivation layer formed in step (2). The processing gas used is ordinarily $C_4F_8$ in step (2) and $SF_6$ in steps (1) and (3).

All the etching methods above share a feature wherein a deposition film formed by a fluorocarbon gas becomes formed at sites, of a substrate, that are unlikely to receive the impact of ions supplied from a plasma, such as the side walls of the etched pattern. When left standing as-is, the deposition film may detach from the substrate, becoming foreign matter, in a subsequent production process, which accordingly entails the need for removing this residual deposition film. Examples of the removal method include ashing by oxygen plasma and cleaning with a removal solution.

Ashing by oxygen plasma is highly reliable as a method for removing a deposition film formed by a fluorocarbon gas. However, the use of oxygen plasma ashing may be limited for instance in a case where an organic film is present as a structure on the surface, or in a case where oxidation of the surface is to be averted as much as possible. Cleaning the deposition film with a removal solution is effective in such a case. The type of cleaning of the deposition film with a removal solution may be of swelling and peeling type, of dissolution type, or may be a combined type of swelling and peeling plus dissolution. Examples of removal solutions used in a swelling and peeling type include hydrofluoroethers (HFEs). These solutions exhibit very high permeability and can permeate into the deposition film, and cause the deposition film to swell, so that the deposition film detaches from the structure. However, these solutions lack the ability of dissolving the deposition film. A concern arises, as a result, in that the deposition film having peeled off the structure may float in the solution and may deposit again on the structure, thereby becoming foreign matter on the structure.

Examples of combined types of removal solutions, i.e. of dissolution type and of a swelling and peeling type, include removal solutions containing hydroxylamine, such as that disclosed in for instance Japanese Patent Application Publication No. 2000-056480. Hydroxylamine exhibits, by virtue of its reducing action, a high dissolving ability of metal oxide residues (dry etching residues), and accordingly removal solutions containing hydroxylamine component are used in insulating film etching processes performed on semiconductors. In semiconductor production processes in general a resist is removed by ashing, followed by removal of the deposition film generated through ashing and a metal oxide residue; it has been found herein that also deposition films can be dissolved by removal solutions containing hydroxylamine. Although the detailed reactions involved are unclear, it is deemed that a removal solution containing hydroxylamine permeates into the deposition film, and causes the deposition film to swell and peel, after which the deposition film itself dissolves; thus, removal solutions containing hydroxylamine are also used in applications of deposition film removal.

SUMMARY OF THE INVENTION

However, removal solutions containing hydroxylamine have the characteristic of readily eroding metallic materials. Due to its reducing action, hydroxylamine on its own has the ability of dissolving metal oxide residues, and hence the hydroxylamine may end up dissolving an oxide film on a metal surface. When water is added to hydroxylamine, $OH^-$ becomes generated as a result of a reaction between the unshared electron pair of N and $H_2O$, as indicated by Formula (1) below. It is deemed that this $OH^-$ promotes the corrosion of metallic materials.

Further, in a case where a multilayer structure of a noble metal layer and a base metal layer is present in the device to be produced, and the base metal of the base metal layer is eroded by the removal solution, a phenomenon may occur in that erosion of the base metal is promoted, in an accelerating fashion, on account of the cell effect. For instance in a device having a wiring formation layer 102 that includes a wiring member 103 on a silicon base material 101, such as that illustrated in FIG. 1, a structure may be envisaged in which an electrode member 105 is connected from the wiring member 103 via a close contact member 104 made up of a metallic material, to form an electrode. When a combination that utilizes TiW (titanium tungsten) as the base metal of the close contact member 104 and Au as a noble metal of the electrode member 105 is selected, a problem arises in that side etching progresses as a result of erosion of TiW which is a base metal. The wiring member 103 and the electrode member 105 may in some instances become disconnected.

(1)

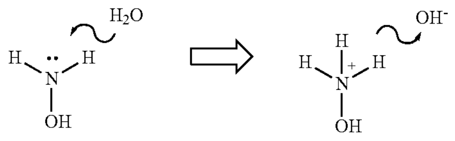

Herein $OH^-$ is generated also through addition of water not only to hydroxylamine but also to general amines (Formula (2) below). Amines are molecules in which the H atoms of ammonia are substituted with organic substituents such as alkyl groups. Amines having one H substitution site are called primary amines, amines having two H substitution sites are called secondary amines, and amines having three H substitution sites are called tertiary amines. In hydroxylamine, only one substituted side chain is not an organic side chain but an OH group.

(2)

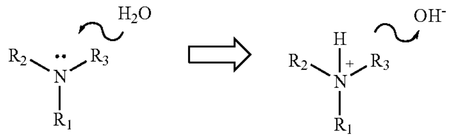

In Formula (2), $R_1$, $R_2$ and $R_3$ are each independent substituents.

Further, $OH^-$ generated as a result of the reaction between the amine and water can improve the peeling strength of the resist, but on the other hand may promote metal damage. No studies are thus far extant on the adjustment of the content of water in removal solutions containing hydroxylamine. That is because the material called hydroxylamine is very unstable, and accordingly is not handled in a pure substance state, but is distributed only in the form of aqueous solutions.

Similarly, tetramethylammonium hydroxide (hereafter referred to as TMAH) may be added in order to improve the deposition film removal power; however, this substance itself is an $OH^-$ source, and thus can promote metal damage. However, it has not been possible to achieve a sufficient deposition film removal power in a case where the amount of TMAH added in the removal solution is reduced, or no TMAH is added.

As pointed out above, the problem of metal corrosion is inevitable so long as a removal solution is used that contains hydroxylamine.

The present disclosure provides a method for producing a silicon substrate, and a method for producing a liquid ejection head, that allow dissolving a deposition film formed by a fluorocarbon gas, and allow suppressing base metal corrosion derived from the cell effect.

The present disclosure relates to a method for producing a silicon substrate comprising a silicon base material; and a wiring formation layer laminated on a base material surface of the silicon base material, and being provided with a wiring member, an electrode member comprising a noble metal, and a close contact member comprising a base metal between the wiring member and the electrode member, wherein the method comprises a step of forming a deposition film by a fluorocarbon gas, in etching of the silicon substrate; and a removal step of removing, by a removal solution, the deposition film formed by the fluorocarbon gas;

the removal solution comprises a primary amine and an organic polar solvent;

a content of water in the removal solution is 10 mass % or lower; and a content of tetramethylammonium hydroxide in the removal solution is 1 mass % or lower.

Further, the present disclosure relates to a method for producing a liquid ejection head comprising a silicon substrate comprising a silicon base material, and a wiring formation layer laminated on a base material surface of the silicon base material, and being provided with a wiring member, an electrode member comprising a noble metal, and a close contact member comprising a base metal between the wiring member and the electrode member;

a liquid common flow channel and a liquid supply flow channel communicating with the liquid common flow channel, provided on the silicon substrate; and a flow channel member provided on the wiring formation layer, and comprising an ejection port ejecting a liquid, and communicating with the liquid supply flow channel and the ejection port, wherein the method comprises a step of forming a deposition film by a fluorocarbon gas, in etching of the silicon substrate; and a removal step of removing, by a removal solution, the deposition film formed by the fluorocarbon gas;

the removal solution comprises a primary amine and an organic polar solvent, a content of water in the removal solution is 10 mass % or lower, and a content of tetramethylammonium hydroxide in the removal solution is 1 mass % or lower.

The present disclosure succeeds in providing a method for producing a silicon substrate, and a method for producing a liquid ejection head, that allow dissolving a deposition film formed by a fluorocarbon gas, and allow suppressing base metal corrosion derived from the cell effect. Further features of the present invention will become apparent from the following description of exemplary embodiments with reference to the attached drawings.

DESCRIPTION OF THE EMBODIMENTS

Figure 1:
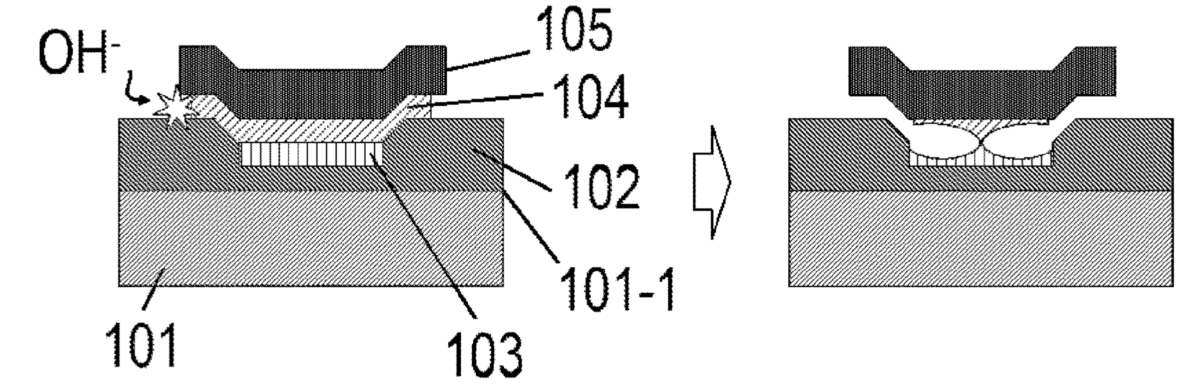
FIG. 1 is a diagram for explaining conceptually a cell effect at the time of immersion in a removal solution.

Embodiments for carrying out the present disclosure will be illustrated below in specific terms, with reference to accompanying drawings. However, the dimensions, materials, shapes, relative arrangement and so forth of the constituent components described in the embodiments are to be modified as appropriate depending on the configuration of the members to which the disclosure is to be applied, and on various conditions. That is, the scope of the present disclosure is not meant to be limited to the implementations below.

In the present disclosure, the expression of "from XX to YY" or "XX to YY" indicating a numerical range means a numerical range including a lower limit and an upper limit which are end points, unless otherwise specified. When a numerical range is described in a stepwise manner, the upper and lower limits of each numerical range can be arbitrarily combined.

The present disclosure relates to a method for producing a silicon substrate comprising a silicon base material; and a wiring formation layer laminated on a base material surface of the silicon base material, and being provided with a wiring member, an electrode member comprising a noble metal, and a close contact member comprising a base metal between the wiring member and the electrode member, wherein the method comprises a step of forming a deposition film by a fluorocarbon gas, in etching of the silicon substrate; and a removal step of removing, by a removal solution, the deposition film formed by the fluorocarbon gas;

the removal solution comprises a primary amine and an organic polar solvent;

a content of water in the removal solution is 10 mass % or lower; and a content of tetramethylammonium hydroxide in the removal solution is 1 mass % or lower.

Further, the present disclosure relates to a method for producing a liquid ejection head comprising a silicon substrate comprising a silicon base material, and a wiring formation layer laminated on a base material surface of the silicon base material, and being provided with a wiring member, an electrode member comprising a noble metal, and a close contact member comprising a base metal between the wiring member and the electrode member;

a liquid common flow channel and a liquid supply flow channel communicating with the liquid common flow channel, provided on the silicon substrate; and a flow channel member provided on the wiring formation layer, and comprising an ejection port ejecting a liquid, and communicating with the liquid supply flow channel and the ejection port, wherein the method comprises a step of forming a deposition film by a fluorocarbon gas, in etching of the silicon substrate; and a removal step of removing, by a removal solution, the deposition film formed by the fluorocarbon gas;

the removal solution comprises a primary amine and an organic polar solvent, a content of water in the removal solution is 10 mass % or lower, and a content of tetramethylammonium hydroxide in the removal solution is 1 mass % or lower.

An inkjet head will be explained as instance of an application example of a liquid ejection head, but the scope of application of the liquid ejection head is not limited thereto.

A silicon substrate produced in accordance with the production method of the present invention is a silicon substrate comprising, a wiring formation layer laminated on a base material surface of a silicon base material, and being provided with a wiring member, an electrode member comprising a noble metal, and a close contact member, comprising a base metal, between the wiring member and the electrode member. The electrode member and the close contact member are electrically connected to each other, and accordingly the base metal of the close contact member is readily corroded on account of the cell effect. Known methods can be suitably used as the methods for respectively producing the wiring member, and the wiring formation layer having the electrode member and close contact member provided thereon.

The term noble metal denotes a metal of higher standard electrode potential than that of hydrogen, while the term base metal denotes a metal having a lower standard electrode potential than that of hydrogen. Examples of noble metals include copper, mercury, silver, palladium, platinum, gold and iridium, while examples of base metals include lithium, potassium, calcium, aluminum, titanium, manganese, zinc, nickel, lead, titanium nitride and TiW. Moreover, noble metals and base metals include arbitrary alloys of metals. Preferably, the noble metal that is used is at least one selected from the group consisting of platinum, gold and iridium. Preferably, the base metal that is used is at least one selected from the group consisting of aluminum, titanium, titanium nitride and TiW.

The removal solution used in the method for producing a substrate can dissolve a deposition film formed by a resist and a fluorocarbon gas. The fluorocarbon gas is not particularly limited so long as it is a fluorocarbon gas ordinarily used in the production of silicon substrates. The most basic components for dissolving deposition films are organic polar solvents. Examples of organic polar solvents include at least one selected from the group consisting of sulfoxides such as dimethyl sulfoxide (hereafter also referred to as DMSO); sulfones such as dimethylsulfone, diethylsulfone, bis(2-hydroxyethyl)sulfone and tetramethylene sulfone; amides such as N,N-dimethylformamide, N-methylformamide, N,N-dimethylacetoamide, N-methylacetoamide and N,N-diethylacetoamide; lactams such as N-methyl-2-pyrrolidone (hereafter also referred to as NMP), N-ethyl-2-pyrrolidone, N-propyl-2-pyrrolidone, N-hydroxymethyl-2-pyrrolidone and N-hydroxyethyl-2-pyrrolidone; imidazolidinones such as 1,3-dimethyl-2-imidazolidinone, 1,3-diethyl-2-imidazolidinone and 1,3-diisopropyl-2-imidazolidinone; propylene carbonate; nitromethane; and acetonitrile. Preferred among the foregoing is at least one selected from the group consisting of DMSO and NMP, since the deposition film formed by a resist or by a fluorocarbon gas in DMSO and NMP exhibits high solubility.

The organic polar solvent preferably has a relative permittivity of 30 or higher, and more preferably 40 or higher. The deposition film formed by a fluorocarbon gas can be easily dissolved by using a removal solution such that an organic polar solvent thereof has a dielectric constant of 30 or more. The upper limit is not particularly limited, but may be 100 or less, or 80 or less. As the relative permittivity there can be used an actually measured value, or a known value in the literature. Examples of literature include manufacturer's catalogues, solvent handbooks and chemical handbooks.

The content of the organic polar solvent is not particularly limited, but is preferably 20 mass % or higher, and more preferably 25 mass % or higher, relative to the totality of the of the removal solution. The content is preferably 80 mass % or lower, and more preferably 75 mass % or lower.

The removal solution used in the method for producing a silicon substrate contains an amine as a dissolution aid that helps the resist and the deposition film to dissolve in an organic solvent. Amines are molecules in which the H atoms of ammonia are substituted with organic substituents such as alkyl groups. The amine used as a dissolution aid that helps the resist to dissolve may be a primary amine, a secondary amine, or a tertiary amine; however, the amine used as a dissolution aid that helps the deposition film to dissolve is a primarily amine. Although details will be described further on, this is preferable in that when the unshared electron pair of N in the amine reacts with the deposition film, the primary amine permeates readily into the deposition film, thanks to the low steric hindrance of the amine.

The primary amine comprised in the removal solution is not particularly limited, but preferably the primary amine has a substituent of lower steric hindrance. Specifically, the substituent is a hydroxyalkyl group having 4 or fewer carbon atoms or an alkyl group having 4 of fewer carbon atoms, more preferably a hydroxyalkyl group having 2 or fewer carbon atoms, or an alkyl group having 2 or fewer carbon atoms. The lower limit is not particularly restricted, but a hydroxyalkyl group or an alkyl group having 1 or more carbon atoms is preferred herein. That is, R in the above primary amine represented by formula $NH_2R$ is preferably a C1 to C4 hydroxyalkyl group or C1 to C4 alkyl group.

Examples of preferred primary amines include methylamine, methanolamine, ethylamine, 1-aminoethanol, 2-aminoethanol, n-propylamine, isopropylamine, n-propanolamine, isopropanolamine, n-butylamine, isobutylamine, tert-butylamine, n-butanolamine, isobutanolamine and tert-butanolamine.

The content of the primary amine in the removal solution as a whole is not particularly limited, but is preferably 20 mass % or higher, and more preferably 25 mass % or higher, relative to the removal solution as a whole. The reaction of the primary amine with the deposition film can be promoted within this range. The content is preferably 80 mass % or lower, and more preferably 75 mass % or lower. Within this range, the content of the organic polar solvent can be increased, and the deposition film can be effectively dissolved.

Figure 2:
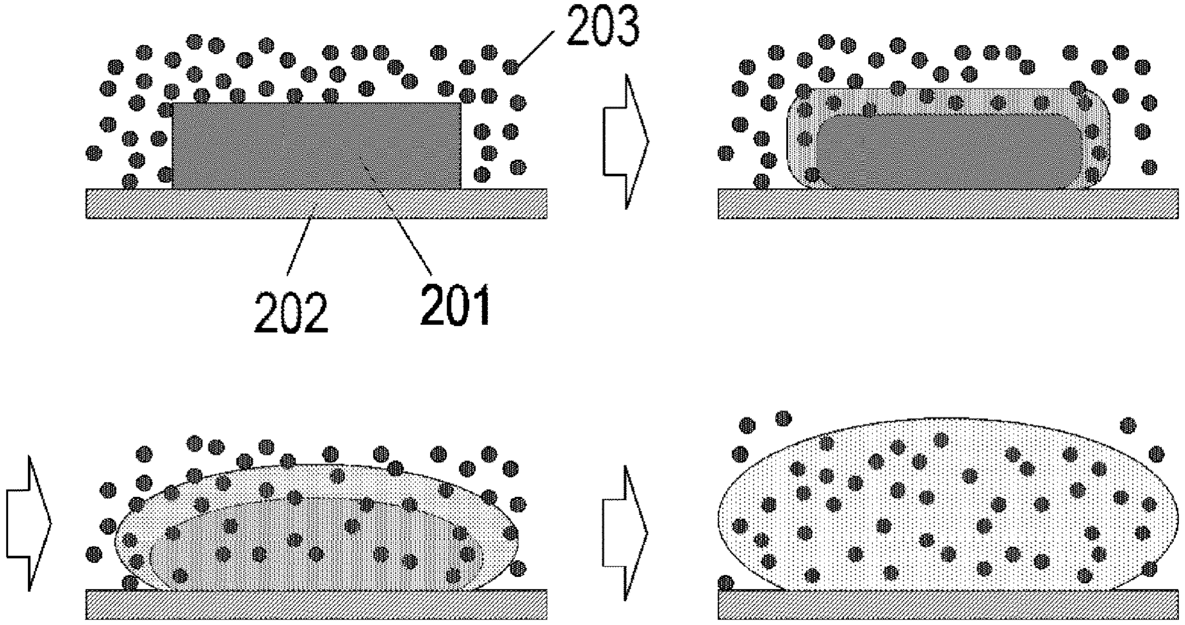
FIG. 2 is a diagram for explaining a reaction in which a resist is dissolved by an organic polar solvent.

FIG. 2 depicts an image of the action of the removal solution. FIG. 2 illustrates a schematic diagram in which a resist is used, as an example of the target to be dissolved by the removal solution. A solvent 203 permeates into a resist 201 formed on the substrate 202, and the resist is dissolved while being caused to swell. An amine is present as a dissolution aid that promotes the swelling action of the solvent and that helps the resist to dissolve in the organic polar solvent.

The unshared electron pair of N of the amine is what brings out herein reactivity with the resist. This may involve for instance solubilization through formation of a salt of the amine and OH groups in a positive resist, as denoted by Formula (3).

$$ROH\text{ (positive resist)}+NR_3\text{ (amine)}\rightarrow RO^-\text{ (soluble)}+NR_3H^+ \quad (3)$$

In Formula (3), R is an arbitrary substituent.

Further examples include solubilization derived from a nucleophilic addition reaction of the amine with a carbonyl group in the positive resist, as illustrated in Formulae (4) and (5). A schematic diagram of the use of a primary amine will be illustrated herein.

(4) The amine takes part in a nucleophilic addition reaction with a carbonyl carbon (—C═O) in the positive resist.

(5) The amine addition product is protonated, dehydrated and deprotonated, to become thereafter a soluble compound that dissolves in the removal solution.

(4)

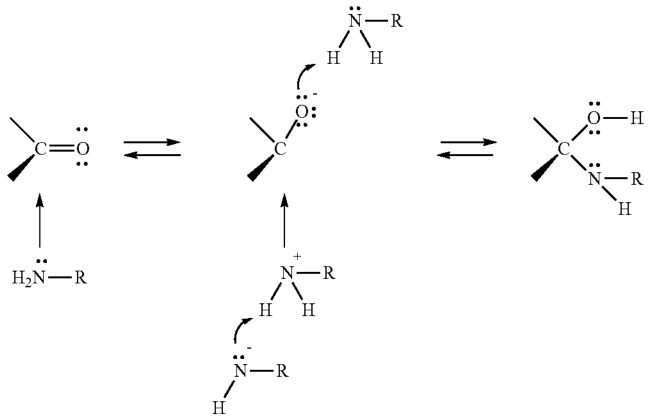

(5)

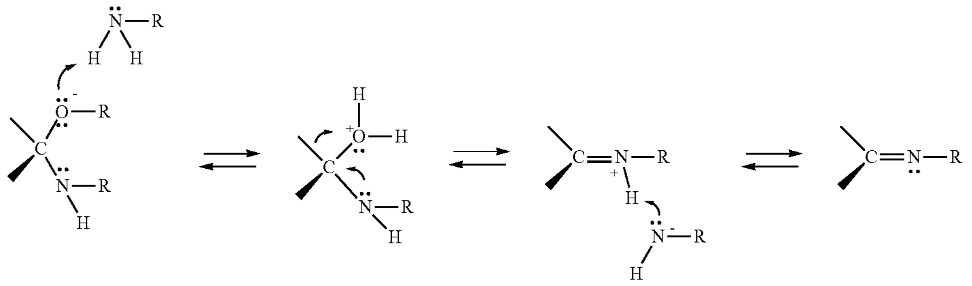

Meanwhile, $OH^-$ may be generated upon addition of water to the amine; alternatively, $OH^-$ may be generated upon addition of TMAH, as described above. This reaction between $OH^-$ and the resist is deemed to be a reaction in which $OH^-$ participates in a nucleophilic addition reaction with a carbonyl group in the positive resist, for instance as illustrated in Formula (6) below. As a result of the reaction, the resist becomes a compound that is soluble in the removal solution, and the compound dissolves accordingly in the removal solution.

(6)

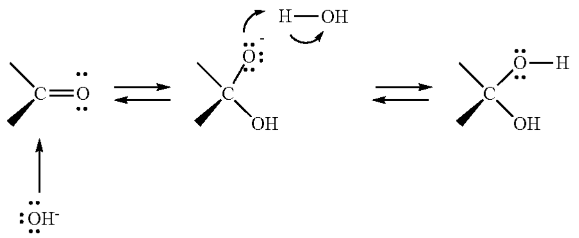

The action of the amine that is used at the time of dissolution of the resist using the organic polar solvent is as described above; herein it is deemed that also the action of the primary amine used at the time of dissolution of the deposition film formed by a fluorocarbon gas, using an organic polar solvent, is similar to the above action.

In the removal solution used in the method for producing a silicon substrate, a content of water is 10 mass % or lower. Generation of $OH^-$ in the removal solution can be suppressed, as much as possible, when the water content lies in such a range. Although $OH^-$ has the effect of promoting dissolution of the deposition film, it is however preferable to curtail generation of $OH^-$, from the viewpoint of the cell effect.

The content of water is preferably lower than 10 mass %, and is more preferably 3 mass % or lower, and yet more preferably 1 mass % or lower. The content of water is preferably 0 mass %, but may be 0.3 mass % or higher, or 0.5 mass % or higher. The form of the water is not particularly limited, and known water forms can be arbitrarily used herein.

In the removal solution used in the method for producing a silicon substrate, a content of TMAH is 1 mass % or lower. Generation of $OH^-$ in the removal solution can be suppressed as much as possible when the content of TMAH lies in such a range. Although $OH^-$ has the effect of promoting dissolution of the deposition film, it is however preferable to suppress generation of $OH^-$, from the viewpoint of the cell effect. The content of TMAH is preferably 1 mass % or lower, more preferably 0.5 mass % or lower, and yet more preferably 0.3 mass % or lower. The content of TMAH is preferably 0 mass %, but may be 0.1 mass % or higher, or 0.2 mass % or higher.

The removal solution used in the method for producing a silicon substrate may comprise hydroxylamine. However, hydroxylamine elicits the effect of eroding metals and hence the content of hydroxylamine in the removal solution is preferably low. The content is preferably 2.5 mass % or lower, more preferably 1.0 mass % or lower, and yet more preferably 0.5 mass % or lower. The content of the hydroxylamine is preferably 0 mass %, but may be 0.1 mass % or higher, or 0.2 mass % or higher.

Dissolution of the deposition film was checked for removal solutions having various compositions, in order to ascertain the action on the deposition film formed by the fluorocarbon gas. As the deposition film there was used a deposition film formed using octafluorocyclobutane as a feedstock gas at the time of execution of only the step corresponding to formation of a passivation layer, in dry etching by the Bosch process. The results are given in Table 1. The composition ratio of each component is the value in the SDS notation of each removal solution. Immersion conditions for dissolution of the deposition film include 60° C. and 30 min.

The decrement in film thickness of each sample after immersion was measured, and then the erosion rate of deposition film dissolution was worked out by calculating "measured value (nm)"/"30 min". Evaluation criteria were set as follows.

A: 25 or greater

B: greater than 0 and smaller than 25

C: no dissolution observed

The deposition film was not dissolved in the case of Level J, in which the removal solution contained only an organic polar solvent. Therefore, although combining an organic polar solvent with an amine, TMAH or the like is deemed to be essential herein, the following facts have been learned at least within the scope of the present verification experiments.

Fact (1): the deposition film dissolved (levels A to I, L to N, and Q) when using a removal solution containing no hydroxylamine.

Fact (2): the deposition film did dissolve (levels C, D, H, I and Q) when using a TMAH-containing removal solution. The deposition film dissolved (Level H) in a case where, even though the removal solution did not contain an amine, the removal solution was used did contain TMAH.

Fact (3): even when using a removal solution that did not contain TMAH, the deposition film dissolved (levels E to L to N and S) in a case where the removal solution contained a primary amine. However, the deposition film did not dissolve (Level O) (the amine species in levels A to D are unclear) in a case where the removal solution contained only a secondary or higher amine, as the amine.

Fact (4): even when using removal solutions containing the same primary amine, there were removal solutions in which the deposition film dissolved (levels E to and L to N), and removal solutions in which the deposition film did not dissolve (Level R).

The above facts revealed that hydroxylamine, heretofore deemed necessary for dissolving the deposition film, is not essential.

TABLE 1

| Level | Amine | Solvent | TMAH or water | Others | Deposition film dissolution | TiW film dissolution |
|---|---|---|---|---|---|---|
| A | Organic amine 1-10 mass % | N-methyl-2-pyrrolidone 90-100 mass % | | | B | A |

TABLE 1-continued

| Level | Amine | Solvent | TMAH or water | Others | Deposition film dissolution | TiW film dissolution |
|---|---|---|---|---|---|---|
| B | Organic amine 10-20 mass % | N-methyl-2-pyrrolidone 70-80 mass % | Water 10-20 mass % | | B | B |
| C | Organic amine 1-10 mass % | Heterocyclic compound 20-30 mass % Aliphatic organic solvent 60-70 mass % | TMAH 2-3 mass % | Glycols 1-10 mass % | B | D |
| D | Organic amine 1-10 mass % | N-methyl-2-pyrrolidone 70-80 mass % | TMAH 4.0 mass % Water 1-10 mass % | Glycols 10-20 mass % | B | E |
| E | 2-aminoethanol (primary) 49mass % | Aliphatic organic solvent 30-40 mass % | Water 10-20 mass % | Pyrocatechol 0.99 mass % | B | C |
| F | 2-aminoethanol (primary) 50 mass % Diethanolamine (secondary) 0.1-1 mass % | Dimethyl sulfoxide 40-50 mass % | | | A | A |
| G | 2-aminoethanol (primary) 70 mass % Diethanolamine (secondary) 0.1-1 mass % | Dimethyl sulfoxide 20-30 mass % | | | A | A |
| H | | Dimethyl sulfoxide 65-85 mass % N-methyl-2-pyrrolidone 5-15 mass % | TMAH 1-3 mass % | Glycols 5-20 mass % | B | D |
| I | Diethanolamine (secondary) <1 mass % | Diethylene glycol mono-n-butyl ether 50-60 mass % Propylene glycol 10-20 mass % | TMAH 1-10 mass % Water 20-30 mass % | | A | E |
| J | | Dimethyl sulfoxide 60 mass % N-methyl-2-pyrrolidone 40 mass % | | | C | A |
| K | | N-methyl-2-pyrrolidone 75 mass % | Water 25 mass % | Ammonium fluoride <1 mass % Fluorine compound <1 mass % Additive <1 mass % | C | A |
| L | 2-aminoethanol (primary) 50-80 mass % | Dimethyl sulfoxide 20-50 mass % | | | A | A |
| M | 2-aminoethanol (primary) 20-40 mass % | Dimethyl sulfoxide 60-80 mass % | | | A | A |
| N | 2-aminoethanol (primary) 20-30 mass % | N-methyl-2-pyrrolidone 35-65 mass % Solvent S 5-20 mass % | Water trace amount | Catechol 2-10 mass % | A | A |
| O | Methylethanolamine (secondary) 20-50 mass % | Solvent B 40-70 mass % | | | C | A |
| P | Amine A 5-30 mass % | Diethylene glycol mono-n-butyl ether 70-95 mass % | | | C | A |
| Q | 2-aminoethanol (primary) 5-19 mass % | Solvent A 60-80 mass % Solvent B Undisclosed | TMAH 1-5 mass % Water trace amount | Additive A Undisclosed | A | B |
| R | 2-aminoethanol (primary) 10-20 mass % | Diethylene glycol mono-n-butyl ether 20-30 mass % Ethylene glycol n-butyl ether 20-30 mass % 1 -(2-methoxy-2-methylethoxy)-2-propanol 10-20 mass % | Water 3-4 mass % | Furfuryl alcohol 1-5 mass % Polyether 1-10 mass % | C | A |
| S | Hydroxylamine (primary) 5 mass % 2-aminoethanol (primary) 20 mass % | Propylene glycol monomethyl ether 50-60 mass % | Water <20 mass % | Pyrocatechol 2.5 mass % | A | E |

Then TiW was selected in the above test as a base metal for which corrosion was to be prevented, from the viewpoint of suppression of the cell effect. Table 1 sets out a comparison of erosion rates in the samples having a film of TiW formed on a silicon substrate. The immersion conditions of the samples included 60° C. and 30 min. As a working premise, a low erosion rate of the base metal in a film state presumably entails also little erosion in a case where the base metal develops a cell effect in a silicon substrate state.

The decrement in film thickness of each sample after immersion was measured, and then the erosion rate of TiW was worked out by calculating “measured value (nm)”/“30 min”. Evaluation criteria were set as follows.

A: erosion rate of 0.5 or lower; virtually no erosion observed

B: erosion rate higher than 0.5, up to 5

C: erosion rate higher than 5, up to 10

D: erosion rate higher than 10, up to 20

E: erosion rate higher than 20

The evaluation rating of Level S, i.e. of a removal solution containing hydroxylamine, was E. The following facts were learned from this check.

Fact (5): erosion of TiW was significant (levels C, D, H, I and Q) when using a removal solution containing TMAH.

Fact (6): TiW erosion was significant in a case where a removal solution with a high water content was used (comparison between levels E and S, and A and B).

These verification results revealed for instance the following points, as configuration requirements of a preferred removal solution.

Requirement (1): the content of TMAH and water in the removal solution should be as low as possible; alternatively, the removal solution should contain no TMAH or water (from facts (5) and (6)).

Requirement (2): the removal solution comprises a primary amine (from Fact (3)). That is because although Fact (2) suggests the use of TMAH in order to improve the solubility of the deposition film, Fact (5) indicates that preferably the removal solution contains no TMAH.

Requirement (3): the removal solution comprises an organic polar solvent (from Fact (4)).

It has thus been now found that a removal solution satisfying the above requirements allows dissolving a fluorocarbon deposition film, and suppressing erosion of a base metal derived from the cell effect.

The purpose of "Requirement (1): the content of TMAH and water in the removal solution should be as low as possible; alternatively, the removal solution should contain no TMAH or water" is to curtail a generation source of $OH^-$ as much as possible. Herein $OH^-$ has the effect of promoting dissolution of the deposition film, but from the viewpoint of the cell effect the amount of $OH^-$ that is generated should be limited as much as possible.

Specifically, within the range of the verification results in Table 1, the greater part of the removal solutions of levels C, D, H, I, and Q have a TMAH range, in the SDS notation, with a minimum of 1 mass %. The TMAH content of the removal solutions of levels C and H is notated, in the SDS, as an upper limit of 3 mass %. It is accordingly considered that the TMAH content is, at least, 1 mass % or lower, and may be preferably lower than 0.5 mass %.

Regarding water, the Level S is notated as lower than 20 mass %, and levels B and E are notated as 10 mass % to 20 mass %. It is accordingly considered that, the content of water may at least be 10 mass % or lower, preferably 3 mass % or lower. Actually, for instance in Level R the removal solution contained 10 mass % to 20 mass % of 2-aminoethanol, but the content of water was 3 mass % to 4 mass %, and erosion of TiW was not observed. It is conceivable to ensure the dissolution ability of the deposition film on the basis of requirements (2) and (3), instead of by narrowing down the content of TMAH or water.

The purpose of "Requirement (2): the removal solution comprises a primary amine" is to allow the amine, as a dissolution aid, to properly react with the deposition film. Table 2 sets out the structures of the amines included in in each level. When two or more side chains are substituted, steric hindrances arise at the time of the reaction between the unshared electron pair of N and the deposition film, and it is deemed that, as a result, permeation of amine into the deposition film does not progress much. In Level O, for instance the removal solution did not contain a primary amine but methylethanol amine, which is a secondary amine; in Level O, however the deposition film was not dissolved. For the same reason it is presumed that the removal solution containing a tertiary amine would fail to dissolve the deposition film, and that, preferably, the side chain of the primary amine is short.

In the results of Table 1 the deposition film actually dissolved in primary amines having a short side chain, hydroxylamine, and 2-aminoethanol. The amine species in levels A, B, C and D are unclear, but are definitely neither hydroxylamine nor 2-aminoethanol, for which SDS labeling is mandatory. It is accordingly considered that the amine species in levels A, B, C and D are secondary or higher amines, or primary amines with long side chains. From the viewpoint of the cell effect, hydroxylamine is preferably excluded from amines that the removal solution can contain; levels A, B, C and D are slightly inferior in deposition film solubility, and accordingly it is deemed that 2-aminoethanol is most preferable herein.

TABLE 2

| | Amine class | Level with content of the amine | Structure |
|---|---|---|---|
| Hydroxylamine | 1 | S | 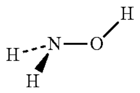 |
| 2-aminoethanol | 1 | E, F, G, L, M, N, Q, R, S | 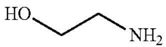 |
| Diethanolamine | 2 | F, G, I | 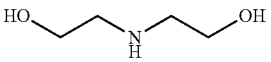 |
| Methyl-ethanolamine | 2 | O | 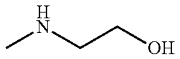 |

The purpose of "Requirement (3): the removal solution comprises an organic polar solvent" is to dissolve the deposition film. For instance within the range of the verification results in Table 1, levels A to G and L to N are instances where it is considered that the deposition film dissolves, from among levels in which no TMAH or hydroxylamine is contained. Although there are some removal solutions with undisclosed components, for instance DMSO and NMP are preferred herein. These two components are representative as organic polar solvents of high polarity. However, the solvent is not limited to DMSO or NMP, and in terms of relative permittivity, the organic polar solvent has a relative permittivity of 30 or higher. The removal solution in Level R contains 10 mass % to 20 mass % of 2-aminoethanol but fails to dissolve the deposition film, and does not contain an organic polar solvent such as those above. These results allow inferring that even in a state where the deposition film can be dissolved by a primary amine, the deposition film fails nevertheless to be dissolved if the capability of the solvent that is to dissolve the deposition film is low. The relative permittivity values of organic solvents having a known composition in Table 1 are as follows. Specifically, DMSO has a relative permittivity of 46.7, NMP of 32.0, propylene glycol of 32.0, ethylene glycol-n-butyl ether of 9.4, 1-(2-methoxy-2-methylethoxy)-2-propanol of 7.7, diethylene glycol mono-n-butyl ether of 10.2, and propylene glycol monomethyl ether of 12.3.

Given Requirement (3) above, it is deemed that the role of the solvent is significant and that the deposition film is not dissolved only by the amine. It is accordingly considered that there is a range suitable for the content of the amine as well. In levels F, G, L, M, and N, the evaluation rating of deposition film dissolution is "A", and the evaluation rating of TiW erosion amount is "A". The total content of 2-aminoethanol at each level is 20 mass % to 80 mass %. Therefore, it is deemed that the content of amine should desirably lie within this range.

EXAMPLES

The examples below illustrate examples of a liquid ejection head, as an example of the application of the present invention to a more concrete device, but the present invention is not limited to the described examples.

Example 1

Figure 3A:
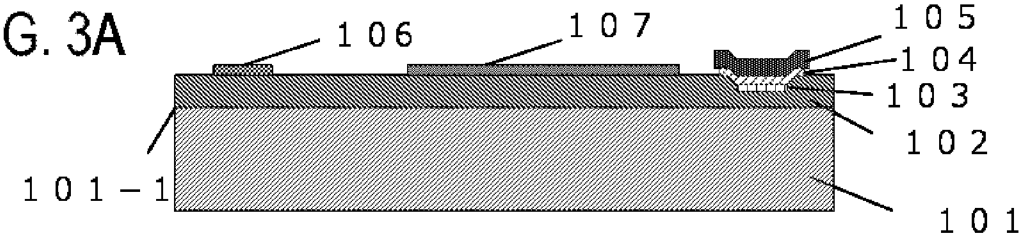
FIG. 3A to FIG. 3F are a production example of a liquid ejection head.

As the present example there is explained a method for producing a liquid ejection head having a silicon substrate, such as that illustrated in FIG. 3A to FIG. 3F. A wiring formation layer 102 having an ejection energy generating element 106, and including the ejection energy generating element 106 and a wiring member 103, is formed on a base material surface 101-1 of a silicon base material 101. The wiring member 103 is formed of Al having Cu added thereto, and TiW is formed as a close contact member 104 and Au as an electrode member 105, in order to draw current from the Al wiring member. An organic structure 107 is formed, on the silicon base material, at a region different from that of the electrode (FIG. 3A). The ejection energy generating element 106 is preferably disposed so as to oppose a below-described ejection port 112. The wiring formation layer may be directly laid up on the silicon base material, and may include a base material layer having another function, between the wiring formation layer and the silicon base material.

Figure 3B:
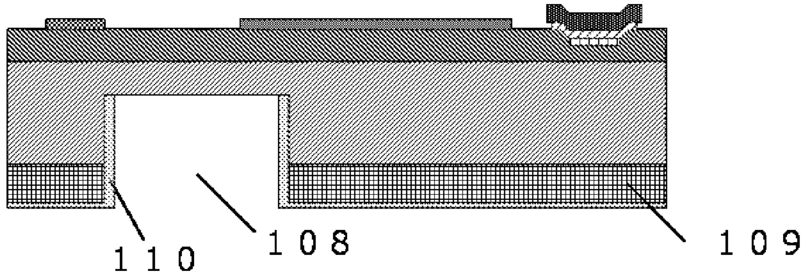

In order to form a liquid supply flow channel 111 on the silicon base material there is performed dry etching of silicon or of a silicon-based insulating film. In the present example, firstly, a liquid common flow channel 108 was formed from a silicon base material surface, on the reverse side from that of the surface having the wiring formation layer 102, by high-speed silicon etching in accordance with the Bosch process (FIG. 3B). To form the liquid common flow channel 108, etching was performed using a novolac-based positive resist 109 as a mask, whereupon a deposition film 110 was formed, by a fluorocarbon gas, on the front surface and side surfaces of the resist, and the side surfaces of the etched pattern. A known material can be used as the etching mask, so long as it dissolves in a removal solution; examples of the material include for instance acrylic resins such as polymethyl methacrylate, urethane resins such as polyurethane; phenolic resins such as novolac resins; styrene resins such as polyhydroxystyrene; and resins having an aliphatic polycyclic skeleton.

Figure 3C:
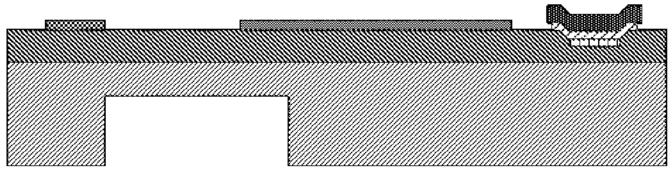

Subsequently the modified layer on the resist surface was removed by ashing, followed by a removal step of performing a treatment under predetermined conditions (temperature 60° C., duration 60 minutes) using the removal solution, to remove the deposition film 110 and the resist 109 (FIG. 3C).

Figure 3D:
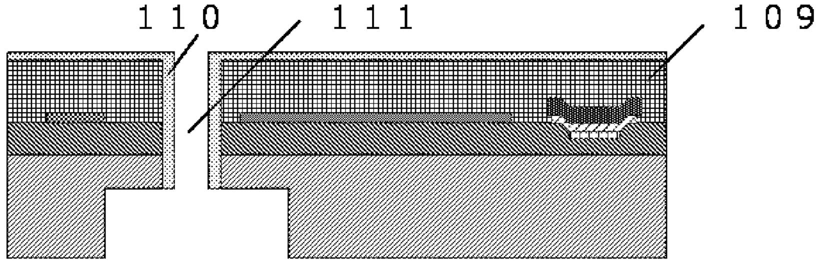

The liquid supply flow channel 111 was formed, from the side of the surface having the wiring formation layer 102. To form the liquid supply flow channel 111, firstly a silicon-based interlayer insulating film of the wiring formation layer 102 was opened by dry etching, mainly with a fluorocarbon gas. Next the opening was caused to communicate with the liquid common flow channel 108 as a result of high-speed silicon etching in accordance with the Bosch process (FIG. 3D). To form the liquid supply flow channel 111, etching was performed using the novolac-based positive resist 109 as a mask, whereupon the deposition film 110 became formed, by a fluorocarbon gas, on the front surface and side surfaces of the resist and on the side surfaces of the etched pattern.

Figure 3E:
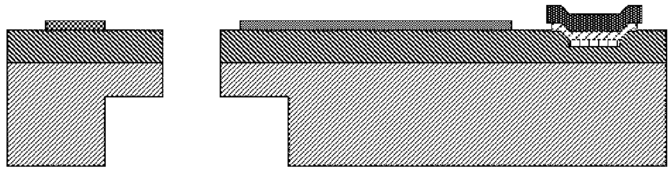

The modified layer on the resist surface was removed by ashing, followed by a removal step of performing a treatment under predetermined conditions (temperature 60° C., duration 60 minutes) using the removal solution, to remove the deposition film 110 and the resist 109 (FIG. 3E).

Ashing is herein not particularly limited so long as ashing conditions are such that the modified layer on the resist surface can be removed; for instance, a method that involves a treatment with a microwave-excited oxygen plasma may be resorted to herein.

In the present embodiment, as described above, the resist was removed and the deposition film was removed using a removal solution. As described above, part of the resist modified by dry etching may be removed by ashing prior to immersion in the removal solution. Although it is possible to remove, as they are, all of the resist and the deposition film by ashing, the treatment time involved may in some instances be very long, depending on the thickness of the resist. Also, in a case where an element such as the organic structure 107 is present that has to remain on the surface, as in the present example, it is not possible to selectively leave the organic structure 107 standing just by resorting to ashing. A removal step by the removal solution of the invention of the present application is effective in such cases. That is, a removal step by the removal solution of the invention of the present application allows the organic structure to remain on the wiring formation layer, also after execution of the removal step, in a case where the silicon substrate prior to the removal step has, on the wiring formation layer, an organic structure that does not dissolve in the removal solution. For instance it has been found that the material of the organic structure 107 of the present embodiment, which is epoxy-based, is not removed using the above removal solution. Examples of materials of the organic structure that do not dissolve in the removal solution include epoxy resins such as bisphenol A-type epoxy resins, bisphenol F-type epoxy resins, alkylene oxide-modified epoxy resins and glycidylamine-type epoxy resins. In the present example there was selected a step of removing the modified layer on the resist surface by ashing, followed by removal of the remaining resist and the deposition film using the removal solution.

In the present embodiment the silicon substrate has an organic structure, on the wiring formation layer, that does not dissolve in the removal solution; herein the organic structure may be laminated on the surface of the silicon base material on which a wiring formation layer is not present, or may be laminated on another base material layer that is in turn laid up on the silicon base material surface.

A removal solution comprising 70 mass % of 2-aminoethanol and 30 mass % of DMSO was used in the present example. This is one representative composition within the range denoted by Level L in Table 1. A measurement of the side etching amount of TiW when using this removal solution revealed that the side etching amount at a treatment temperature of 60° C. and for a treatment time of 30 min was 0.2 μm or less.

Method for Measuring a TiW Side Etching Amount

In the present example the side etching amount of TiW was measured as follows.

A monitor pattern in which a noble metal layer and a base metal layer were laid up on the substrate surface of a silicon substrate was produced, and the dimensions of the noble metal layer, which was the outermost surface, were measured prior to the removal step in which the removal solution was used.

After the removal step has been performed using the removal solution, only the noble metal layer is removed selectively, to expose the base metal layer. Thereafter, the side etching amount was worked out by measuring the dimensions of the base metal layer. A test was performed using the monitor pattern in this manner; the obtained side etching amount matched the side etching amount obtained by observing, by SEM, a cross section of the liquid ejection head as a deliverable product.

The value allowable for side etching of TiW is for instance about 5 μm in the present liquid ejection head. The value of the side etching amount is the measured value upon execution of the removal step once; in the present embodiment, as described above, the removal step is performed twice. The amount of side etching after one removal step was however 2.5 μm or less, and accordingly it is not expected that the side etching amount should exceed 5 μm even after two removal steps. It was therefore found that the cell effect could be sufficiently suppressed. The silicon substrate in the state of FIG. 3B and the state of FIG. 3D was removed using the removal solution. The treatment conditions were 60° C. and 30 min. It was found that a photoresist and the deposition film were dissolved and removed as expected (FIG. 3C and FIG. 3E).

Figure 3F:
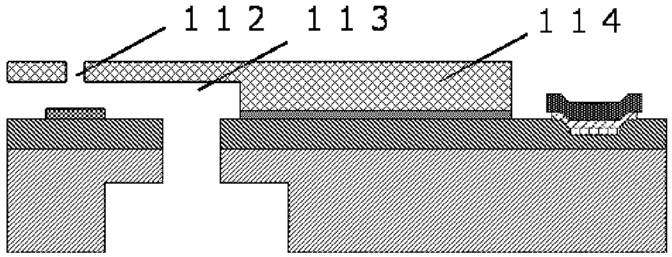

In the present example the ejection port 112 for ejecting droplets and a liquid flow channel 113 communicating with the liquid supply flow channel and the ejection port were formed, on the silicon substrate, by the flow channel member 114 (FIG. 3F). Similarly to the organic structure 107, the flow channel member 114 is made up of a material that does not dissolve in the removal solution, and may be the same material as the organic structure 107, or a different material. At this time the organic structure 107 acts as an adhesion layer between the wiring formation layer 102 and the flow channel member 114. That is, the organic structure 107 forms part of the liquid flow channel 113. The liquid ejection head could be produced as a result of these steps. In some cases the flow channel member 114 is formed directly, without the intervening organic structure 107. In that case as well, the deposition film can be removed in the same removal step as described above.

Comparative Example 1

The liquid ejection head of Comparative example 1 was produced in the same way as in Example 1, but in this case a hydroxylamine-containing liquid corresponding to the Level S was used as the removal solution; the side etching amount of TiW was about 0.8 μm to 16 μm in a 30-minute treatment.

Although the underlying mechanism is not well understood, TiW side etching tends to worsen as the time of usage of the removal solution wears on. Herein 0.8 μm was a minimum value at a time where a new solution was used, and 16 μm was the maximum value observed up to that point in time, i.e. after 6 days had elapsed. Given that there were two removal steps, it was found that although at least the TiW side etching amount must be curtailed to 2.5 μm or less, this value would be actually exceeded in about 1 or 2 days after the removal solution started being used. This result indicated that the removal solution of Example 1 allows significantly suppressing the cell effect, as compared with a hydroxylamine-containing removal solution.

Comparative Example 2

A liquid ejection head of Comparative example 2 was produced in the same way as in Example 1, but using herein the removal solution corresponding to Level R, as the removal solution; the TiW side etching amount after a 30-minute treatment was about 0.2 μm, comparable to that of Example 1.

However, a large amount of residue perceived as a deposition film became deposited on the silicon substrate, due to the fact that the removal step was performed using the above removal solution. This removal solution does not comprise DMSO or NMP as an organic polar solvent. It is deemed that, as a result, the deposition film could not be dissolved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-121566, filed Jul. 26, 2021, which is hereby incorporated by reference herein in its entirety.

What is claimed is:

1. A method for producing a silicon substrate comprising:
a silicon base material; and
a wiring formation layer laminated on a base material surface of the silicon base material, and being provided with a wiring member, an electrode member comprising a noble metal, and a close contact member comprising a base metal between the wiring member and the electrode member,
the method comprising:
a step of forming a deposition film by a fluorocarbon gas, in etching of the silicon substrate; and
a step of removing, by a removal solution, the deposition film formed by the fluorocarbon gas,
wherein the removal solution comprises a primary amine and an organic polar solvent,
wherein a content of the primary amine in the removal solution is 20 to 80 mass %,
wherein a content of water in the removal solution is 10 mass % or lower, and
wherein a content of tetramethylammonium hydroxide in the removal solution is 1 mass % or lower.

2. The method according to claim 1, wherein relative permittivity of the organic polar solvent is 30 or higher.

3. The method according to claim 1, wherein the organic polar solvent comprises at least one selected from the group consisting of dimethyl sulfoxide and N-methyl-2-pyrrolidone.

4. The method according to claim 1, wherein the primary amine is represented by general formula $NH_2R$, where R is a C1 to C4 hydroxyalkyl group or a C1 to C4 alkyl group.

5. The method according to claim 4, wherein the primary amine is 2-aminoethanol.

6. The method according to claim 1, wherein the deposition film is removed through dissolution in the removal solution.

7. The method according to claim 1, wherein the noble metal is Au, and the base metal is TiW.

8. The method according to claim 1, wherein the silicon substrate comprises, on the wiring formation layer, an organic structure not dissolving in the removal solution.

9. The method according to claim 1, wherein the content of water in the removal solution is 3 mass % or lower.

10. The method according to claim 1, wherein the content of water in the removal solution is 1 mass % or lower.

11. The method according to claim 1, further comprising a step of removing by ashing before the step of removing by the removal solution.

12. The method according to claim 1, wherein a content of the organic polar solvent in the removal solution is 20 to 80 mass %.

13. The method according to claim 1, wherein the content of tetramethylammonium hydroxide in the removal solution is 0.3 mass % or lower.

14. A method for producing a liquid ejection head comprising:

a silicon substrate comprising a silicon base material, and a wiring formation layer laminated on a base material surface of the silicon base material, and being provided with a wiring member, an electrode member comprising a noble metal, and a close contact member comprising a base metal between the wiring member and the electrode member;

a liquid common flow channel and a liquid supply flow channel communicating with the liquid common flow channel, provided on the silicon substrate; and a flow channel member provided on the wiring formation layer, and comprising an ejection port ejecting a liquid, and communicating with the liquid supply flow channel and the ejection port, the method comprising:

a step of forming a deposition film by a fluorocarbon gas, in etching of the silicon substrate; and a step of removing, by a removal solution, the deposition film formed by the fluorocarbon gas, wherein the removal solution comprises a primary amine and an organic polar solvent, wherein a content of the primary amine in the removal solution is 20 to 80 mass %, wherein a content of water in the removal solution is 10 mass % or lower, and wherein a content of tetramethylammonium hydroxide in the removal solution is 1 mass % or lower.

15. The method according to claim 14, wherein a relative permittivity of the organic polar solvent is 30 or higher.

16. The method according to claim 14, wherein the organic polar solvent comprises at least one selected from the group consisting of dimethyl sulfoxide and N-methyl-2-pyrrolidone.

17. The method according to claim 14, wherein the primary amine is represented by general formula $NH_2R$, where R is a C1 to C4 hydroxyalkyl group or a C1 to C4 alkyl group.

18. The method according to claim 14, wherein the noble metal is Au, and the base metal is TiW.

19. The method according to claim 14, wherein an organic structure not dissolving in the removal solution is present between the flow channel member and the wiring formation layer.

20. The method according to claim 14, wherein the content of tetramethylammonium hydroxide in the removal solution is 0.3 mass % or lower.

* * * * *